United States Patent
Knox (10) Patent No.: US 7,302,825 B2
(45) Date of Patent: Dec. 4, 2007

(54) VEHICLE SUSPENSION TESTING AND DEMONSTRATING

(75) Inventor: Lawrence D. Knox, Hopkinton, MA (US)

(73) Assignee: Bose Corporation, Framingham, MA (US)

(*) Notice: Subject to any disclaimer, the term of this patent is extended or adjusted under 35 U.S.C. 154(b) by 225 days.

(21) Appl. No.: 11/213,099

(22) Filed: Aug. 26, 2005

(65) Prior Publication Data

US 2007/0044537 A1    Mar. 1, 2007

(51) Int. Cl.
*G01M 17/04* (2006.01)

(52) U.S. Cl. .................................. 73/11.04; 73/669

(58) Field of Classification Search ................ 73/669, 73/670, 11.04, 11.05, 11.07, 11.08, 11.09, 73/12.01, 118.1
See application file for complete search history.

(56) References Cited

U.S. PATENT DOCUMENTS

| | | | | |
|---|---|---|---|---|
| 3,001,394 A | * | 9/1961 | Nelson | 73/669 |
| 3,877,289 A | * | 4/1975 | KcKenney et al. | 73/11.07 |
| 3,914,990 A | * | 10/1975 | Borg | 73/670 |
| 4,455,866 A | | 6/1984 | Barrigar | |
| 5,065,618 A | * | 11/1991 | Hodges et al. | 73/146 |
| 5,106,226 A | | 4/1992 | Fanslow et al. | |
| 5,610,330 A | * | 3/1997 | Fricke et al. | 73/146 |
| 5,639,179 A | | 6/1997 | Jensen | |
| 5,775,834 A | | 7/1998 | Jackson | |
| 5,877,414 A | * | 3/1999 | Rui et al. | 73/146 |
| 6,029,764 A | * | 2/2000 | Schubert | 180/89.13 |
| 6,174,103 B1 | | 1/2001 | Stroman | |
| 6,309,137 B1 | | 10/2001 | Hirsch | |
| 6,623,206 B1 | | 9/2003 | Blair et al. | |
| 2005/0025569 A1 | | 2/2005 | Kozlowski | |

FOREIGN PATENT DOCUMENTS

DE    195 37 991    4/1997
DE    297 03 370    5/1998

OTHER PUBLICATIONS

European Search Report issued on Jan. 16, 2007 in European Application No. 06118706.8, filed Aug. 10, 2006.

* cited by examiner

*Primary Examiner*—Eric S. McCall
(74) *Attorney, Agent, or Firm*—Fish & Richardson P.C.

(57) ABSTRACT

A suspension testing or demonstrating apparatus includes a first section of track having a first undulation that displaces a wheel of the vehicle by a first predetermined amount when the wheel traverses at least a portion of the first undulation. A second section of track is positioned proximate to the first section of track such that the wheel traverses the second section of track after traversing the first section of track. The second section of track includes a second undulation that displaces the wheel of the vehicle by a second predetermined amount when the wheel traverses at least a portion of the second undulation.

41 Claims, 7 Drawing Sheets

VEHICLE SUSPENSION TESTING AND DEMONSTRATING

The present invention relates in general to vehicle suspension testing and demonstrating and more particularly to modular apparatus and techniques for vehicle suspension testing and demonstrating.

BACKGROUND OF THE INVENTION

Motor vehicle proving grounds are sometimes used to test vehicle suspensions. The proving grounds generally include bumps of various shapes that are formed in the surface of the roadway.

SUMMARY OF THE INVENTION

It is an important object of the invention to provide modular vehicle suspension testing.

In one aspect, the invention is embodied in a modular apparatus for testing a suspension of a vehicle. The modular apparatus includes a first undulation that displaces a wheel of the vehicle by a first predetermined amount when the wheel traverses at least a portion of the first undulation. A second undulation is coupled to the first undulation such that the wheel traverses the second undulation after traversing the first undulation. The second undulation displaces the wheel of the vehicle by a second predetermined amount when the wheel traverses at least a portion of the second undulation.

The apparatus can include a third undulation that is coupled to the second undulation such that the wheel traverses the third undulation after traversing the second undulation. In another embodiment, the third undulation is positioned adjacent to at least one of the first and the second undulations such that another wheel of the vehicle traverses the third undulation.

The first, second and third undulations can be positioned to induce a pitch or a roll in a chassis of the vehicle. The distance between each of the first, second, and third undulations can be varied. In addition, the shape, width, and height of each of the first, second, and third undulations is variable. In one embodiment, the profile of the first and second undulations is sinusoidal. The distance between the first and the second undulations can be substantially equal to a length of a wheelbase of the vehicle. The first undulation can be substantially the same as the second undulation. Also, at least one of the first and the second undulations is fabricated from rubber, metal, wood, and plastic.

In one embodiment, at least one of the first and the second undulations comprises a surface texture. The apparatus can also include a device, such as an anchor, a tether, or a cleat, for mounting at least one of the first and the second undulations to a road surface. The first and the second undulations can be portable.

In another aspect, the invention is embodied in a modular apparatus for testing a suspension of a vehicle. The modular apparatus includes a first section of track having a first undulation that displaces a wheel of the vehicle by a first predetermined amount when the wheel traverses at least a portion of the first undulation. The modular apparatus also includes a second section of track that is positioned proximate to the first section of track such that the wheel traverses the second section of track after traversing the first section of track. The second section of track includes a second undulation that displaces the wheel of the vehicle by a second predetermined amount when the wheel traverses at least a portion of the second undulation.

The first section of track can be coupled to the second section of track. One or both of the first and the second sections of track is substantially in the shape of an arc. One or both of the first and the second sections of track includes multiple undulations. The distance between each of the multiple undulations can be variable. The shape, width, and/or height of each of the multiple undulations can be variable. Each of the first and the second sections of track can include a different number of multiple undulations. The first undulation can be substantially the same as the second undulation. A profile of the first and second undulations can be sinusoidal.

In one embodiment, a distance between the first and the second undulations is substantially equal to a length of a wheelbase of the vehicle. The undulations can be fabricated from rubber, metal, wood, or plastic, for example. The undulations can include a surface texture.

The apparatus can also include a third section of track having a third undulation. The third section of track can be positioned substantially parallel to the first section of track. The first, second and third undulations can be positioned to induce roll or pitch in a chassis of the vehicle. A device for mounting at least one of the first and the second sections of track to a road surface can also be used. The device can be an anchor, a tether, or a cleat, for example. The mass of the vehicle can secure the sections of track to the road surface. The mass of one of the first and the second sections of track can secure the sections of track to a road surface. The first section of track can be mechanically coupled to the second section of track.

In another aspect, the invention is embodied in a method of testing a suspension of a vehicle. The method includes positioning a first and a second section of track on a driving surface such that a wheel of the vehicle traverses the second section of track after traversing the first section of track. The first and the second sections of track include a first undulation and a second undulation, respectively. The method also includes maneuvering the vehicle over the first and the second sections of track such that the wheel traverses the first and the second undulations.

One or both of the sections of track can include multiple undulations. The distance between the first and second sections of track can be varied. In one embodiment, positioning the first and the second sections of track includes positioning the first and the second sections of track such that a distance between the first and the second undulation is substantially equal to a length of a wheelbase of the vehicle.

In one embodiment, the method further includes positioning a third section of track substantially parallel to the first section of track. The third section of track can include a third undulation. The first, second and third undulations can be positioned to induce roll or pitch in a chassis of the vehicle.

The method can also include adjusting the height, width and/or shape of at least one of the first, second, and third undulations. A profile of the first and second undulations can be sinusoidal.

In yet another aspect, the invention is embodied in a vehicle suspension demonstrating apparatus. The vehicle suspension demonstrating apparatus includes a first section of track having a first undulation that displaces a wheel of the vehicle by a first predetermined amount when the wheel traverses at least a portion of the first undulation. The apparatus also includes a second section of track that is positioned proximate to the first section of track such that the wheel traverses the second section of track after traversing the first section of track. The second section of track includes a second undulation that displaces the wheel of the vehicle by a second predetermined amount when the wheel traverses at least a portion of the second undulation.

In one embodiment, the apparatus further includes a third section of track that is positioned adjacent to at least one of the first and the second sections of track such that a second wheel of the vehicle traverses the third section of track. The third section of track includes a third undulation that displaces the second wheel of the vehicle by a third predetermined amount when the second wheel traverses at least a portion of the third undulation.

In one embodiment, the first wheel is located on one side of a chassis of the vehicle and the second wheel is located on an opposite side of the chassis. Two or more of the first, second, and third undulations can be substantially the same. The first, second and third undulations can be positioned to induce roll or pitch in a chassis of the vehicle. A profile of the first and second undulations can be sinusoidal. A distance between the first and the second undulations can be substantially equal to a length of a wheelbase of the vehicle.

In yet another aspect, the invention is embodied in a method of demonstrating a vehicle suspension. The method includes positioning a first and a second section of track on a driving surface such that a first wheel of a vehicle traverses the second section of track after traversing the first section of track. The first and the second sections of track include a first undulation and a second undulation, respectively. The method also includes maneuvering the vehicle over the first and second sections of track such that the first wheel traverses the first and the second undulations.

The method can also include positioning a third section of track on the driving surface such that a second wheel of the vehicle traverses the third section. The third section of track can include a third undulation. The third track can be positioned substantially parallel to the first and the second sections of track. In one embodiment, the first wheel is located on one side of a chassis of the vehicle and the second wheel is located on an opposite side of the chassis. Two of the first, second, and third undulations can be substantially the same. The first, second and third undulations can be positioned to induce roll or pitch in a chassis of the vehicle. A profile of the first and second undulations can be sinusoidal. A distance between the first and the second undulations can be substantially equal to a length of a wheelbase of the vehicle.

In another aspect, the invention is embodied in a manufactured track for vehicle suspension demonstrating. The track includes a first undulation that is formed as part of the road surface. The first undulation displaces a first wheel of a vehicle by a first predetermined amount when the first wheel traverses at least a portion of the first undulation. A second undulation is formed as part of the road surface adjacent to the first undulation such that the first wheel traverses the second undulation after traversing the first undulation. The second undulation displaces the first wheel of the vehicle by a second predetermined amount when the first wheel traverses at least a portion of the second undulation. A third undulation is formed as part of the road surface and is positioned adjacent to at least one of the first and the second undulations such that a second wheel of the vehicle that is located on an opposite side of the vehicle from the first wheel traverses the third undulation. The first, second, and third undulations are positioned to induce at least one of a pitch and a roll in a chassis of the vehicle.

Two or more of the first, second, and third undulations are substantially the same. Two or more of the first, second and third undulations is at least partially formed on the road surface. One or more of the first, second and third undulations can be removable from the road surface.

Other features, objects and advantages will become apparent from the following description when read in connection with the accompanying drawing in which:

DETAILED DESCRIPTION

Figure 1:
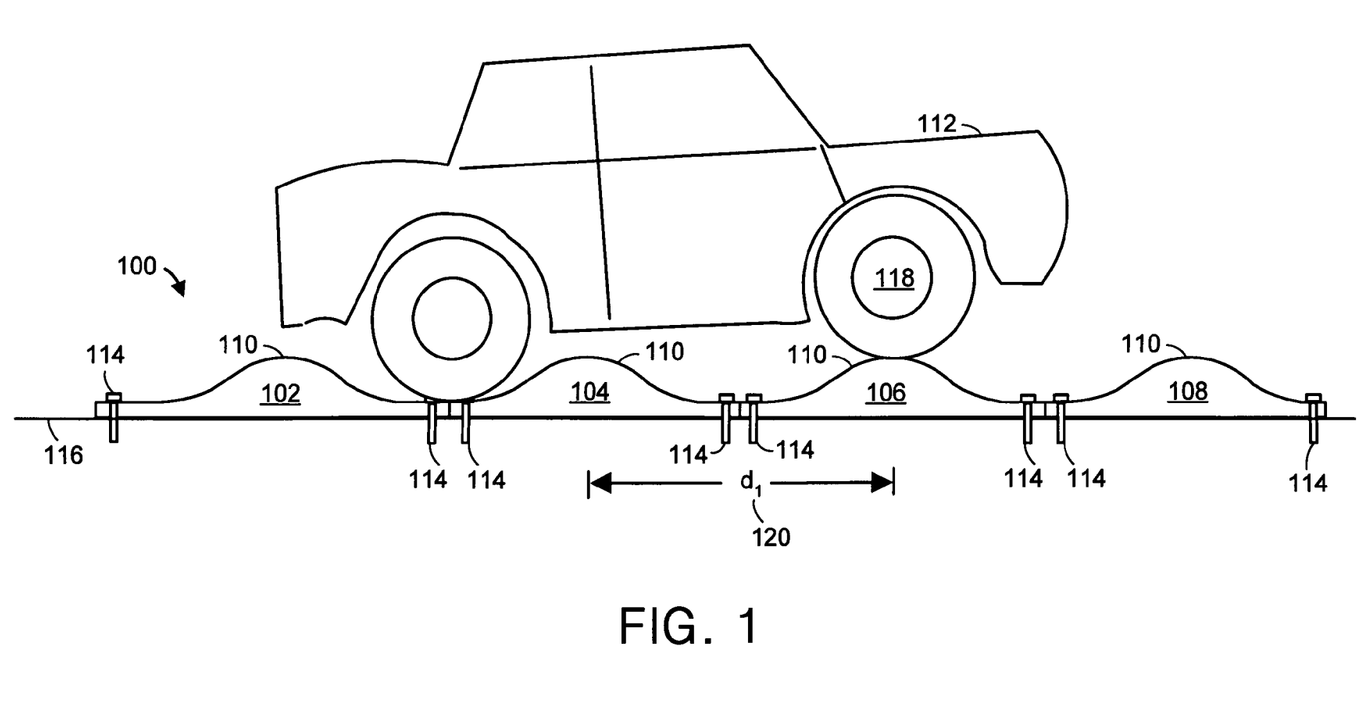
FIG. 1 illustrates a vehicle suspension tester according to one embodiment of the invention.

FIG. 1 illustrates a vehicle suspension tester 100 according to one embodiment of the invention. The vehicle suspension tester 100 includes multiple sections of track 102, 104, 106, and 108. A section of track is defined as a modular and/or portable track segment that can be moved if necessary. Each section of track 102-108 typically includes a single undulation 110. However, a section of track can include any desired number of undulations. The undulations 110 are shown as substantially sinusoidal-shaped raised areas in FIG. 1, but can also include troughs, depressions, ruts, bumps, ramps, or steps, for example. Additionally, the undulations 110 can be fabricated from rubber, metal, wood, plastic, or some combination thereof, for example. A vehicle 112 is shown traversing the vehicle suspension tester 100.

The first section of track 102 can be secured to a road surface 116 using anchors 114. The road surface 116 is defined as any surface on which the vehicle 112 can ride. Other techniques for securing the first section of track 102 can include spikes, bolts, tethers, mass of the track, and the leading edge of the first section of track 102. For example, the mass of the vehicle 112 will secure the first section of track 102 to the road surface 116 when a wheel 118 of the vehicle 112 begins to traverse the first section of track 102. In one embodiment, the mass of the first section of track 102 is large enough so that external securing techniques are not required.

In one embodiment, the distance ($d_1$) 120 between the midpoint of each undulation 110 is substantially equal to the wheelbase of the vehicle 112. However, the distance 120 can be any desired distance. The height, width, and shape of one or more of the undulations 110 can also be varied as desired.

The suspension tester 100 can also include additional sections of track (not shown) that are positioned substantially parallel to the multiple sections of track 102-108. The additional sections of track are generally positioned such that a wheel on the opposite side of the vehicle 112 traverses the additional sections of track when the wheel 118 traverses the multiple sections of track 102-108.

In operation, the sections of track are positioned on the road surface 116. The undulations can be arranged to induce roll in the chassis of the vehicle 112. In another embodiment, the undulations can be arranged to induce pitch in the chassis of the vehicle 112.

Once the sections of track are positioned appropriately, the vehicle 112 is maneuvered over the undulations 110. Passengers in the vehicle 112 can experience movement of the chassis of the vehicle 112 as the wheels traverse the undulations 110. Vehicles having different suspension systems and/or different suspension components may behave differently as they traverse the vehicle suspension tester 100.

The vehicle suspension tester 100 can be used as a modular and/or substantially portable demonstration system to demonstrate vehicle suspensions. For example, the vehicle suspension tester 100 can be used by a sales person at a car dealership as a point-of-sale tool for demonstrating the suspensions of various vehicles. The vehicle suspension tester 100 can be installed on the dealership parking lot so that customers can evaluate the suspension of various vehicles in real world scenarios. Thus, an automobile dealer can allow potential customers to drive or be driven in various vehicles over the vehicle suspension tester 100. Potential customers could evaluate the suspensions of the vehicles while seated in the various seating positions within the vehicle.

In one scenario, customers can compare vehicles having active suspensions to vehicles having passive suspensions. The term "active suspension" means any vehicle suspension having a suspension component that is capable of exerting a controlled force between a wheel and a chassis of the vehicle. The term "passive suspension" means any vehicle suspension having only passive suspension components that are not capable of exerting a controlled force between a wheel and a chassis of the vehicle.

A method of demonstrating a vehicle suspension according to one embodiment of the invention can include first positioning multiple sections of track on the dealership parking lot or any driving surface. The multiple sections of track are positioned so that a first wheel of the vehicle traverses one or more undulations included on each section of track. One or more other sections of track are positioned on the driving surface adjacent to the multiple sections of track so that a second wheel of the vehicle that is located on the opposite side of the vehicle traverses one or more undulations that are included on the other sections of track. The sales person or the customer then maneuvers each vehicle over the sections of track to demonstrate the performance of the suspensions of each vehicle.

Figure 2:
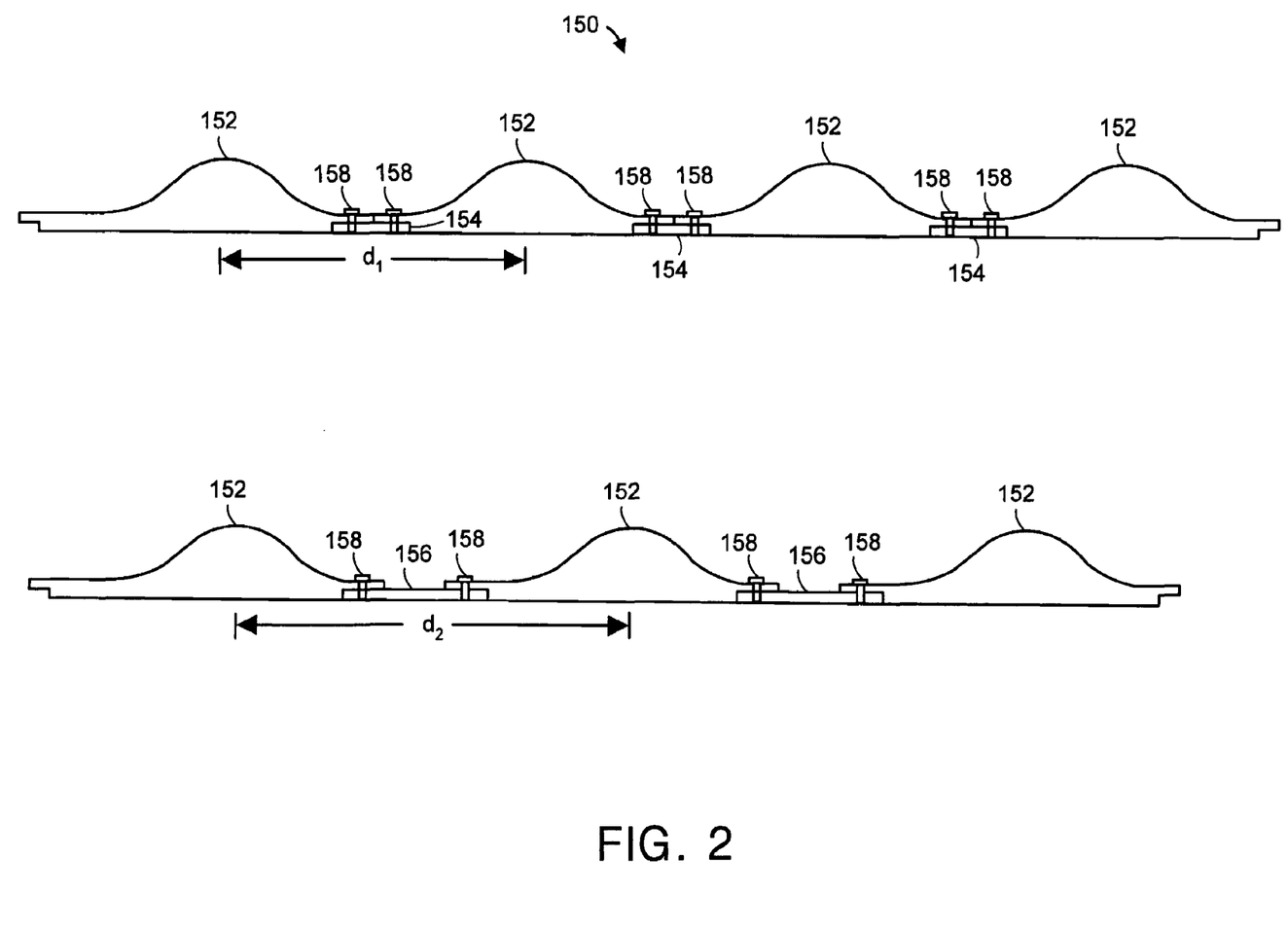
FIG. 2 illustrates a vehicle suspension tester having sections of track with undulations that couple together according to the invention.

FIG. 2 illustrates a vehicle suspension tester 150 having sections of track with undulations 152 that couple together according to the invention. Once the sections of track are coupled, the distance between undulations is fixed. The sections of track 152 are capable of being coupled together to create different distances ($d_1$, $d_2$) between undulations. In one embodiment, the variable distance is achieved using spacer plates 154, 156. The spacer plates 154, 156 can be attached to the sections of track 152 using bolts 158. Other techniques can be used to attach the sections of track 152 to the spacer plates 154, 156.

In other embodiments, the sections of track 152 are coupled together through a drive mechanism (not shown) such that the distance between the undulations can be independently varied. For example, the drive mechanism can include a worm gear that is attached to a drive motor. The worm gear can be coupled to a section of track such that the drive motor causes the section of track to move toward or away from another section of track.

Figure 3:
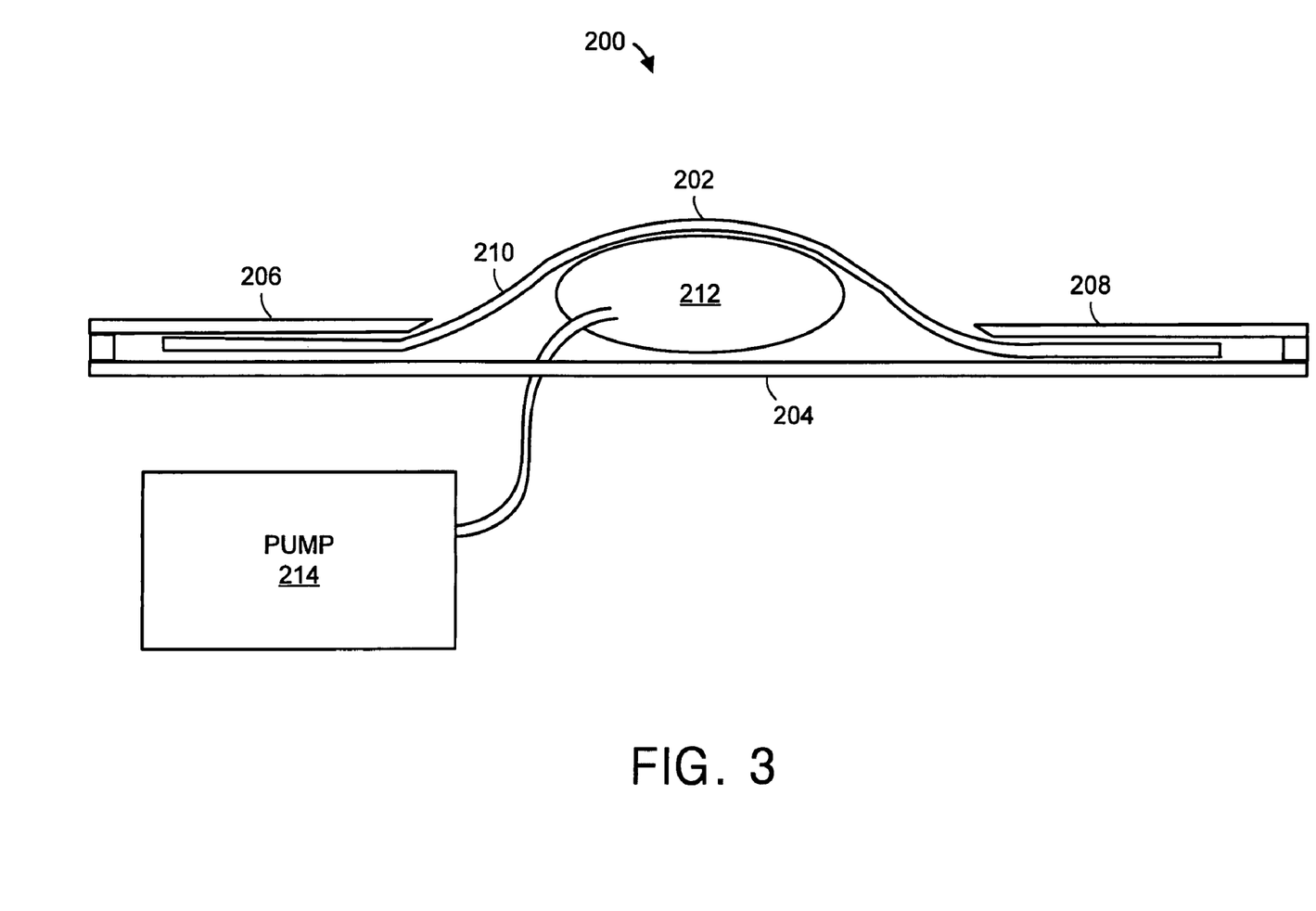
FIG. 3 illustrates a section of track having an undulation with variable height according to the invention.

FIG. 3 illustrates a section of track 200 having an undulation 202 with variable height. The section of track 200 includes a base plate 204. Top plates 206, 208 are coupled to the base plate 204. A deformable plate 210, such as a piece of sheet metal, is positioned between the top plates 206, 208 and the base plate 204. The deformable plate 210 can be a single piece of spring steel or can be multiple pieces of interlocking material.

A bladder 212 is positioned under the deformable plate 210. A pump 214 is coupled to the bladder and can fill the bladder with gas or fluid, for example. The height of the undulation is varied by adjusting the volume of fluid inside the bladder 212. For example, when the fluid fills the bladder 212, the height of the undulation increases as the deformable plate 210 rises.

Other techniques can also be used to vary the height of the undulation 202. For example, a hydraulic actuator can be positioned under the deformable plate 210. In another embodiment, a mechanical scissor jack is positioned under the deformable plate 210.

Figure 4A:
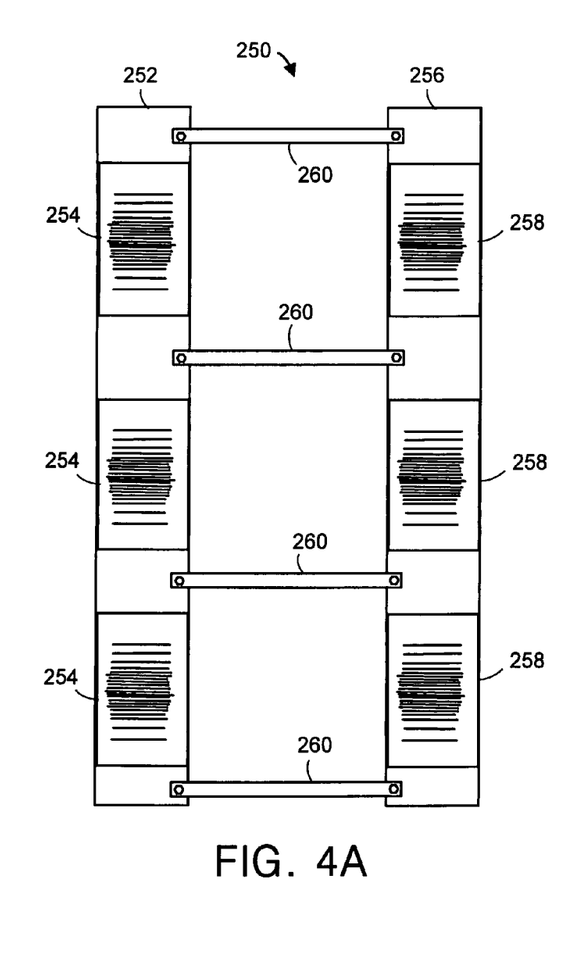
FIG. 4A illustrates a top view of a vehicle suspension tester according to one embodiment of the invention.

FIG. 4A illustrates a top view of a vehicle suspension tester 250 according to one embodiment of the invention. The vehicle suspension tester 250 includes a first section of track 252 having multiple undulations 254. A second section of track 256 is positioned parallel to the first section of track 252. The second section of track 256 includes multiple undulations 258. The undulations 254, 258 are aligned so as to induce pitch in the chassis of a vehicle as the wheels of the vehicle are maneuvered over the vehicle suspension tester 250. One or more rigid members 260 are coupled between the first 252 and the second sections of track 256. The rigid members 260 provide stability between the first 252 and the second sections of track 256 as the vehicle traverses the vehicle suspension tester 250.

Figure 4B:
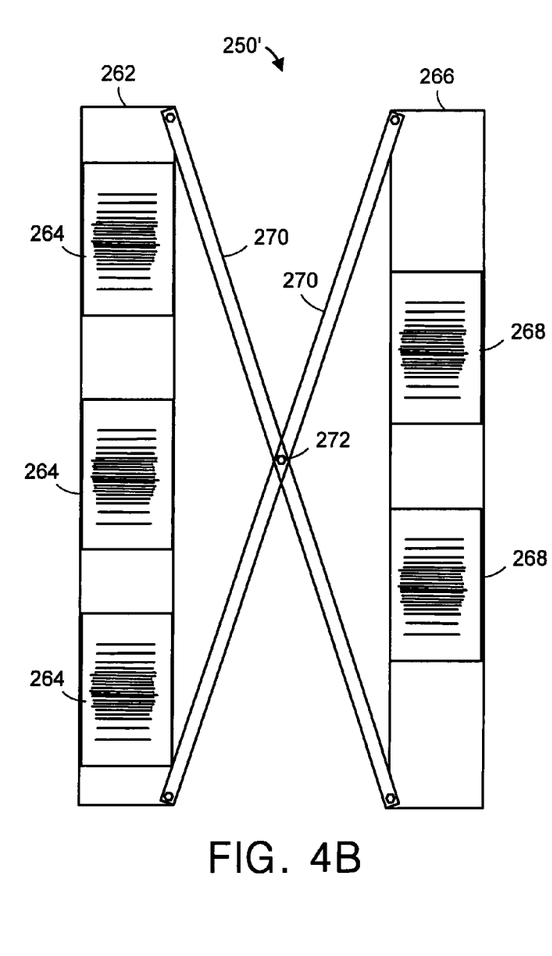
FIG. 4B illustrates a top view of a vehicle suspension tester according to another embodiment of the invention.

FIG. 4B illustrates a top view of a vehicle suspension tester 250' according to another embodiment of the invention. The vehicle suspension tester 250' includes a first section of track 262 having multiple undulations 264. A second section of track 266 is positioned parallel to the first section of track 262. The second section of track 266 includes multiple undulations 268. The undulations 264, 268 are aligned so as to induce roll in the chassis of a vehicle as the wheels of the vehicle are maneuvered over the vehicle suspension tester 250'. In one embodiment, the undulations 264, 268 are constructed and arranged to stimulate a roll resonance in the chassis of the vehicle.

One or more rigid members 270 are coupled between the first 262 and the second sections of track 266. In this embodiment, the rigid members 270 cross each other but can be configured as shown in FIG. 4A. The rigid members 270 can be coupled to each other using hardware 272. The rigid members 270 provide stability between the first 262 and the second sections of track 266 as the vehicle traverses the vehicle suspension tester 250'.

Figure 5:
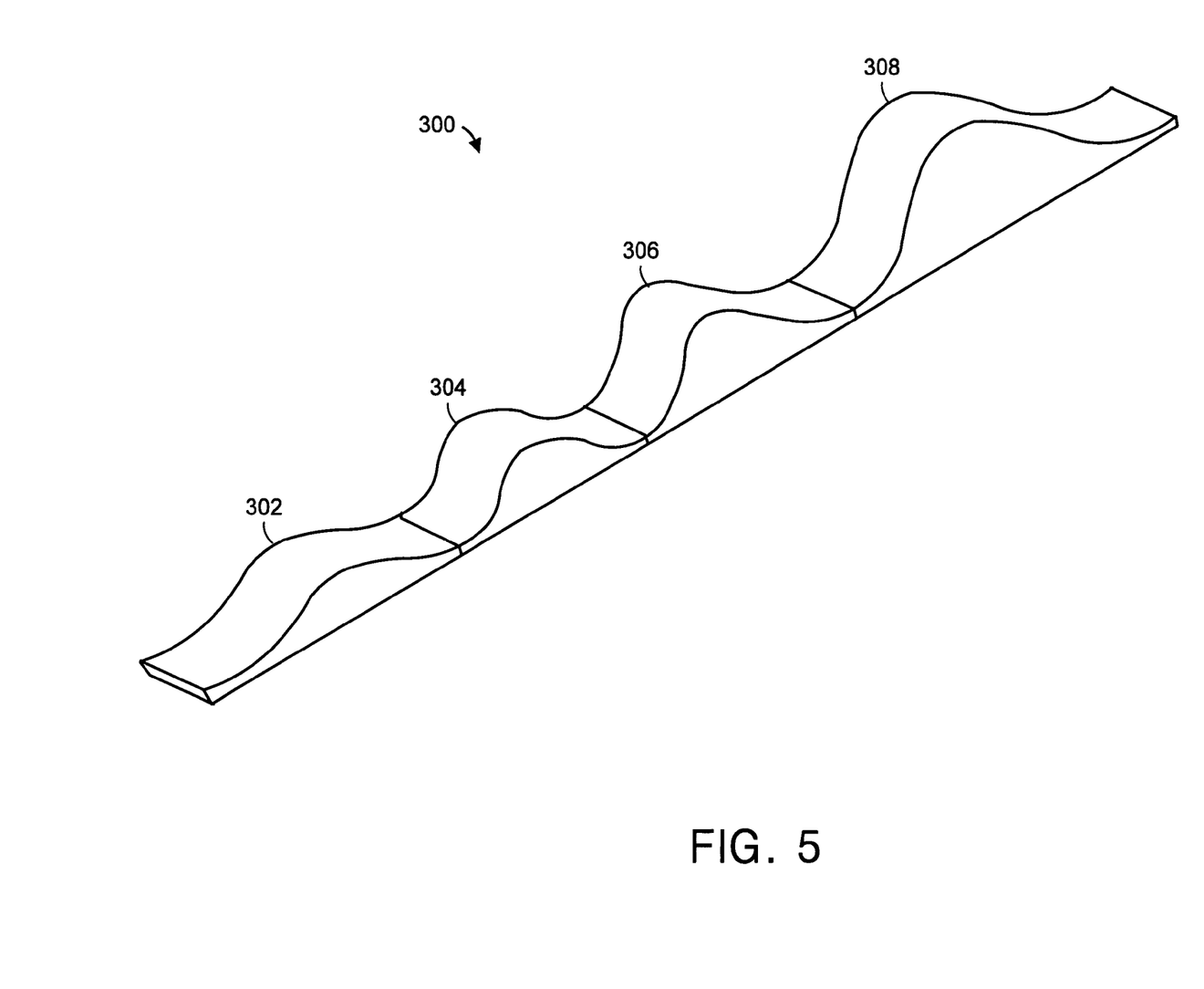
FIG. 5 is a perspective view of a vehicle suspension tester according to one embodiment of the invention.

FIG. 5 is a perspective view of a vehicle suspension tester 300 according to one embodiment of the invention. The vehicle suspension tester 300 includes four undulations 302, 304, 306, and 308. The four undulations 302, 304, 306, and 308 can be coupled together as shown. Once coupled together, the undulations are fixed relative to each other. In one embodiment, each of the four undulations 302, 304, 306, and 308 is coupled to a different section of track and the sections of track are coupled together. In some embodiments, multiple undulations are coupled to individual sections of track. In other embodiments, the undulations 302, 304, 306, and 308 are manufactured and/or formed in/on or as part of a road surface. For example, a track including the undulations 302, 304, 306, and 308 can be manufactured as part of a road surface by paving the undulations 302, 304, 306, and 308 into the asphalt.

As shown in FIG. 5, the four undulations 302, 304, 306, and 308 vary in height. In the embodiment shown, the height of the undulations 302-308 gradually increases between each of the undulations 302-308. Additionally, the distance between each of the four undulations 302, 304, 306, and 308 can also vary. The shape and width of the undulations 302-308 can also be varied. For example, the profile of the undulations 302, 304, 306, and 308 can be substantially sinusoidal in shape.

Figure 6:
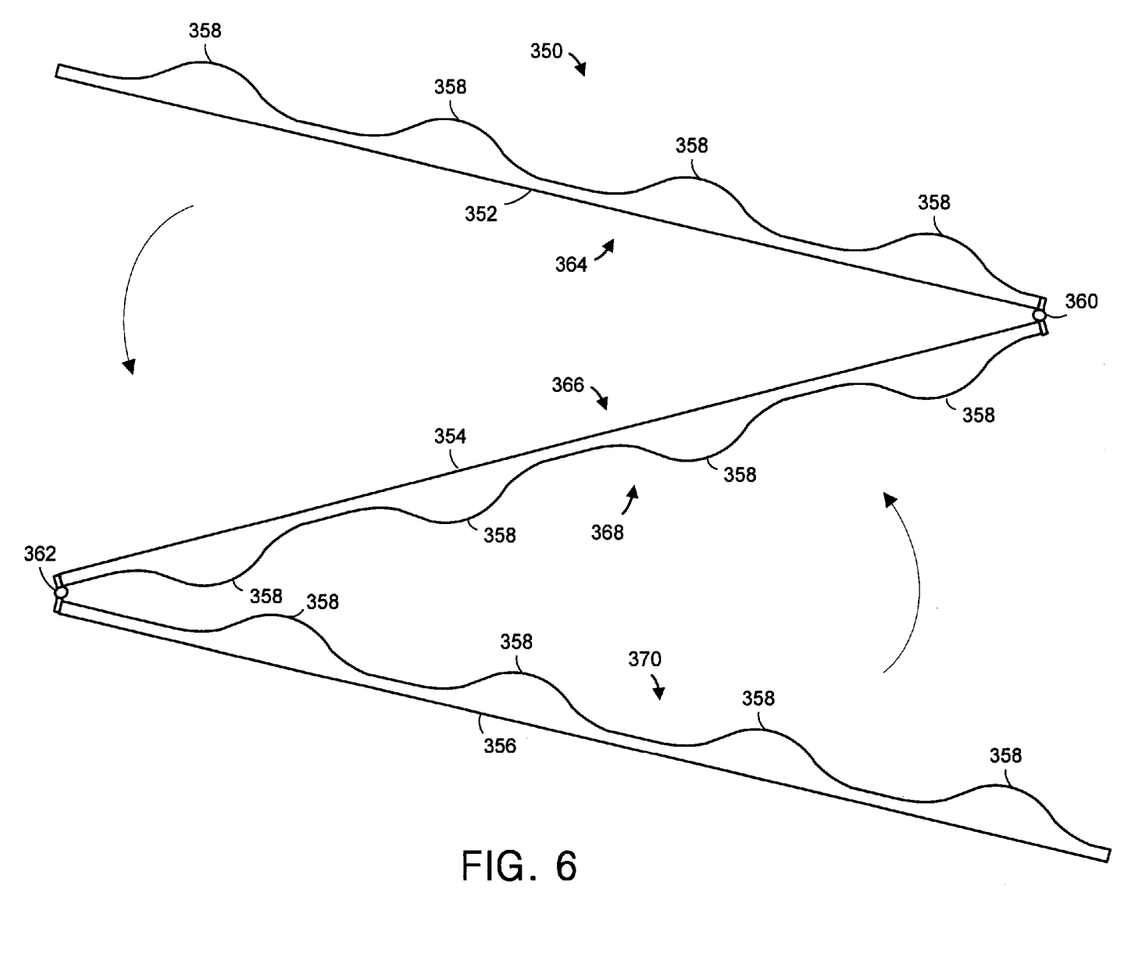
FIG. 6 illustrates a vehicle suspension tester having multiple sections of track.

FIG. 6 illustrates a vehicle suspension tester 350 having multiple sections of track 352, 354, and 356. Each of the sections of track 352, 354, and 356 include multiple undulations 358. The sections of track 352, 354, and 356 are coupled together through hinge mechanisms 360, 362. Other techniques could also be used to couple the sections of track 352, 354, and 356 to each other. In one embodiment, the sections of track 352, 354, and 356 are arranged so that they fold efficiently for storage and/or transportation. For example, in the embodiment shown, the first section of track 352 and the second section of track 354 fold so that the bottom surfaces 364, 366 of the two sections of track 352, 354 meet. Also, the second section of track 354 and the third section of track 356 include undulations 358 that are arranged so that the top surfaces 368, 370 of these two sections of track 354, 358 can be folded efficiently.

Figure 7:
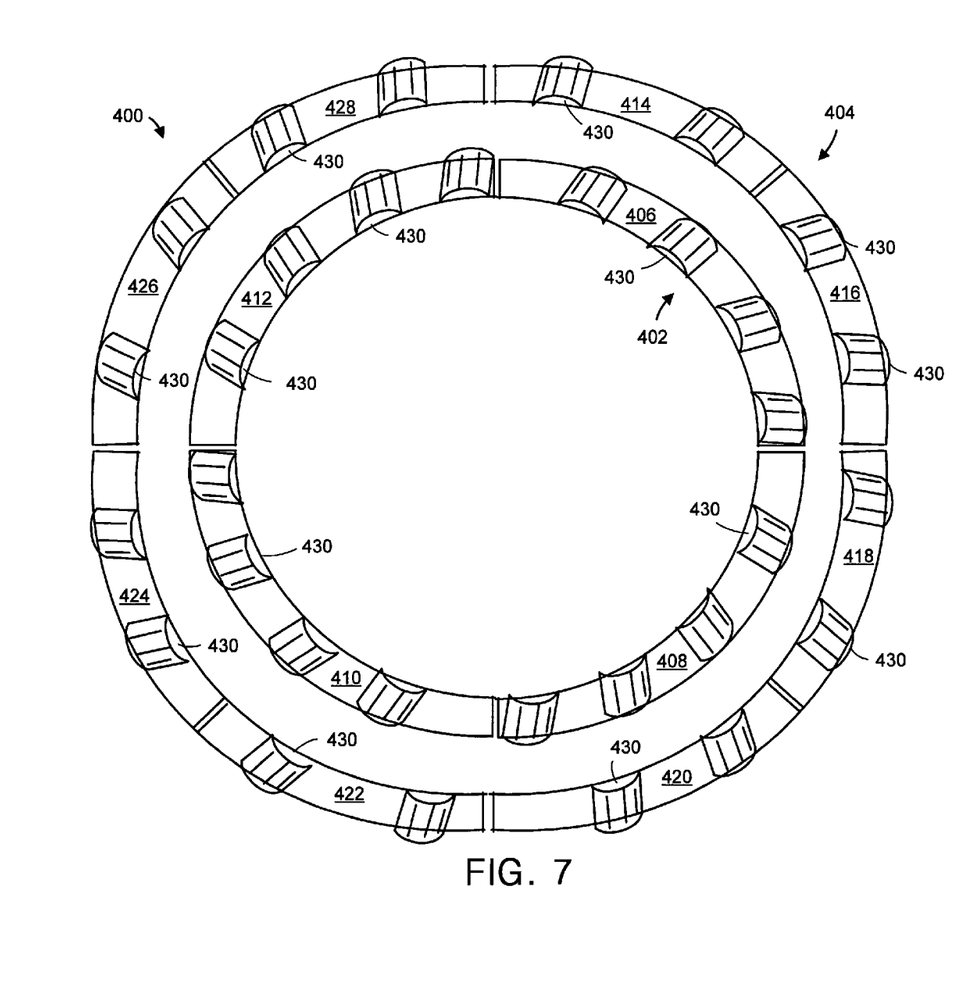
FIG. 7 illustrates a vehicle suspension tester having a substantially circular configuration.

FIG. 7 illustrates a vehicle suspension tester 400 having a substantially circular configuration. The vehicle suspension tester 400 could also be elliptically shaped or configured in any other desired shape. In one embodiment, the vehicle suspension tester 400 includes an inner track 402 and an outer track 404. The inner track 402 includes multiple sections of track 406, 408, 410, and 412. The outer track 404 includes multiple sections of track 414, 416, 418, 420, 422, 424, 426, and 428.

In the embodiment shown, each section of track includes multiple undulations 430. In other embodiments, one or more of the sections of track 406-428 include a single undulation. Additionally the height, width, shape, and distance between undulations 430 can be individually varied. The top surface of one or more of the undulations 430 can be smooth or can include a surface texture to increase the traction of a vehicle wheel on the top surface.

In one embodiment, the inner section of track 406 and two of the outer sections of track 414, 416 are removed in order to provide a test track having a three-quarter circular configuration. Additionally, the sections of track can be configured in a serpentine shape to provide a slalom course for the vehicle to traverse.

The vehicle suspension tester 400 provides multiple simultaneous testing conditions. For example, as a vehicle is maneuvered over the suspension tester 400, the chassis of the vehicle will tend to roll outwardly due to centrifugal forces acting on the chassis. These forces will generally increase as the velocity of the vehicle increases. As the vehicle is maneuvered over the tester 400, the vehicle also traverses the undulations 430. The undulations 430 can induce a separate roll in the vehicle chassis on top of the chassis roll caused by the centrifugal forces. The parameters of separate roll depend on the arrangement of the undulations 430.

In one embodiment, the undulations 430 are arranged to induce a pitch in the vehicle chassis. The undulations 430 can induce the pitch in the vehicle chassis on top of the chassis roll caused by the centrifugal forces. The parameters of pitch depend on the arrangement of the undulations 430.

There has been described novel apparatus and techniques for vehicle suspension testing and demonstrating. It is evident that those skilled in the art may now make numerous modifications of and departures from the specific apparatus and techniques described herein without departing from the inventive concepts. Consequently, the invention is to be construed as embracing each and every feature and novel combination of features present in or possessed by the apparatus and techniques herein disclosed and limited solely by the spirit and scope of the appended claims.

What is claimed is:

1. Modular apparatus for testing a suspension of a vehicle supporting wheels suspended from a chassis comprising:
   a first undulation constructed and arranged to displace a wheel of the vehicle by a first predetermined amount when the wheel traverses at least a portion of the first undulation;
   a second undulation that is coupled to the first undulation constructed and arranged such that when the wheel traverses at least a portion of the second undulation after traversing the first undulation, the second undulation displaces the wheel of the vehicle by a second predetermined amount; and
   a third undulation that is positioned adjacent to at least one of the first and the second undulations such that another wheel of the vehicle may traverse the third undulation,
   wherein at least one of the first, second and third undulations is constructed and arranged to allow its shape to be varied.

2. The apparatus of claim 1 wherein the third undulation is coupled to the second undulation on a path such that the wheel may move along the path and traverse the third undulation after traversing the second undulation.

3. The apparatus of claim 1 wherein the first, second and third undulations are constructed and arranged to induce roll in the chassis when vehicle wheels traverse the undulations.

4. The apparatus of claim 1 wherein the first, second and third undulations are constructed and arranged to induce pitch in the chassis when vehicle wheels traverse the undulation.

5. The apparatus of claim 1 wherein the first, second, and third undulations are constructed and arranged to allow for varying the distance therebetween.

6. The apparatus of claim 1 wherein a profile of the first and second undulations is sinusoidal.

7. The apparatus of claim 1 wherein a distance between the first and the second undulations is substantially equal to a length of a wheelbase of the vehicle.

8. The apparatus of claim 1 wherein the first undulation is substantially the same as the second undulation.

9. The apparatus of claim 1 wherein at least one of the first and the second undulations is fabricated from a material that is chosen from the group comprising, rubber, metal, wood and plastic.

10. The apparatus of claim 1 wherein at least one of the first and the second undulations is formed with a surface texture.

11. The apparatus of claim 1 wherein the first and the second undulations are portable.

12. The apparatus of claim 1 and further comprising a device for mounting at least one of the first and the second undulations to a road surface.

13. Th apparatus of claim 12 wherein the device is chosen from the group comprising an anchor, a tether and a cleat.

14. Modular apparatus for testing a suspension of a vehicle supporting wheels suspended from a chassis comprising:
- a first undulation constructed and arranged displace a wheel of the vehicle by a first predetermined amount when the wheel traverses at least a portion of the first undulation;
- a second undulation that is coupled to the first undulation constructed and arranged such that when the wheel traverses at least a portion of the second undulation after traversing the first undulation, the second undulation displaces the wheel of the vehicle by a second predetermined amount; and
- a third undulation that is positioned adjacent to at least one of the first and the second undulations such that another wheel of the vehicle may traverse the third undulation,
- wherein at least one of the first, second, and third undulations is constructed and arranged with variable width.

15. Modular apparatus for testing a suspension of a vehicle supporting wheels suspended from a chassis comprising:
- a first undulation constructed and arranged displace a wheel of the vehicle by a first predetermined amount when the wheel traverses at least a portion of the first undulation;
- a second undulation that is coupled to the first undulation constructed and arranged such that when the wheel traverses at least a portion of the second undulation after traversing the first undulation, the second undulation displaces the wheel of the vehicle by a second predetermined amount; and
- a third undulation that is positioned adjacent to at least one of the first and the second undulations such that another wheel of the vehicle may traverse the third undulation,
- wherein the at least one of the first, second, and third undulations is constructed and arranged with variable height.

16. Modular apparatus for testing a suspension of a vehicle supporting wheels from a chassis comprising:
- a first section of track comprising a first undulation constructed and arranged to displace a wheel of the vehicle by a first predetermined amount when the wheel traverses at least a portion of the first undulation; and
- a second section of track that is positioned proximate to the first section of track along a path such that when moving along the path the wheel traverses the second section of track after traversing the first section of track,
- the second section of track comprising a second undulation constructed and arranged to displace the wheel by a second predetermined amount when the wheel traverses at least a portion of the second undulation,
- wherein at least one of the first and the second sections of track comprises multiple undulations,
- at least one of the multiple undulations constructed and arranged with variable shape.

17. The apparatus of claim 16 wherein the first section of track is coupled to the second section of track.

18. The apparatus of claim 16 wherein at least one of the first and second sections of track is substantially in the shape of an arc.

19. The apparatus of claim 16 wherein the multiple undulations are constructed and arranged to allow the distance therebetween to be varied.

20. The apparatus of claim 16 wherein each of the first and the second sections of track comprise a different number of multiple undulations.

21. The apparatus of claim 16 wherein the first undulation is substantially the same as the second undulation.

22. The apparatus of claim 16 wherein a profile of the first and second undulations is sinusoidal.

23. The apparatus of claim 16 wherein a distance between the first and the second undulations is substantially equal to the length of the wheelbase of the vehicle.

24. The apparatus of claim 16 wherein at least one of the first and the second undulations is fabricated from a material that is chosen from the group comprising, rubber, metal, wood and plastic.

25. The apparatus of claim 16 wherein at least one of the first and the second undulations is formed with a surface texture.

26. The apparatus of claim 16 and further comprising a vehicle wherein at least one of the first and second sections of track is secured to a road surface by the mass of the vehicle.

27. The apparatus of claim 16 wherein at least one of the first and the second sections of track is secured to a road surface by the mass of the at least one of the first and the second sections of track.

28. The apparatus of claim 16 wherein the first section of track is mechanically coupled to the second section of track.

29. The apparatus of claim 16 and further comprising a device for mounting at least one of the first and the second sections of track to a road surface.

30. The apparatus of claim 29 wherein the device is chosen from the group comprising an anchor, a tether and a cleat.

31. The apparatus of claim 16 and further comprising a third section of track having a third undulation and positioned substantially parallel to the first section of track.

32. The apparatus of claim 31 wherein the first, second and third undulations are constructed and arranged to induce roll in the chassis when vehicle wheels traverse the undulations.

33. The apparatus of claim 31 wherein the first, second and third undulations are constructed and arranged to induce pitch in the chassis when vehicle wheels traverse the undulations.

34. Modular apparatus for testing a suspension of a vehicle supporting wheels from a chassis comprising:
- a first section of track comprising a first undulation constructed and arranged to displace a wheel of the vehicle by a first predetermined amount when the wheel traverses at least a portion of the first undulation; and
- a second section of track that is positioned proximate to the first section of track along a path such that when moving along the path the wheel traverses the second section of track after traversing the first section of track,
- the second section of track comprising a second undulation constructed and arranged to displace the wheel by a second predetermined amount when the wheel traverses at least a portion of the second undulation,
- wherein at least one of the first and the second sections of track comprises multiple undulations, at least one of the multiple undulations having variable width.

35. Modular apparatus for testing a suspension of a vehicle supporting wheels from a chassis comprising:
- a first section of track comprising a first undulation constructed and arranged to displace a wheel of the vehicle by a first predetermined amount when the wheel traverses at least a portion of the first undulation; and
- a second section of track that is positioned proximate to the first section of track along a path such that when moving along the path the wheel traverses the second section of track after traversing the first section of track, the second section of track comprising a second undulation constructed and arranged to displace the wheel by a second predetermined amount when the wheel traverses at least a portion of the second undulation,
- wherein at least one of the first and the second sections of track comprises multiple undulations,
- at least one of the multiple undulations having variable height.

36. A method of testing a suspension of a vehicle supporting wheels from a chassis comprising:
- serially positioning first and second sections of track having first and second undulations respectively on a driving surface;
- moving the motor vehicle over the first and second sections of track such that a wheel traverses the first and the second undulations; and
- adjusting the height of at least one of the first, second and third undulations.

37. The method of claim 36 and further including varying the distance between the first and second sections of track.

38. The method of claim 36 and further including positioning the first and the second sections or track such that the distance between the first and second undulations is substantially equal to a the length of the wheelbase of the vehicle.

39. The method of claim 36 and further comprising positioning a third section of track having a third undulation substantially parallel to the first section of track.

40. The method of claim 39 and further including positioning the first, second and third undulations to induce roll in the chassis of the moving vehicle.

41. The method of claim 39 and further including positioning the first, second and third undulations to induce pitch in the chassis of the moving vehicle.

* * * * *